C. ROBINSON.
SPRING SUSPENSION.
APPLICATION FILED JAN. 17, 1916.

1,196,153.  Patented Aug. 29, 1916.

INVENTOR
Clark Robinson
BY
L. L. Westfall
ATTORNEY

UNITED STATES PATENT OFFICE.

CLARK ROBINSON, OF HILLYARD, WASHINGTON.

SPRING SUSPENSION.

1,196,153.  Specification of Letters Patent.  Patented Aug. 29, 1916.

Application filed January 17, 1916. Serial No. 72,439.

*To all whom it may concern:*

Be it known that I, CLARK ROBINSON, a citizen of the United States of America, residing at Hillyard, in the county of Spokane and State of Washington, have invented certain new and useful Improvements in Spring Suspension, of which the following is a specification.

This invention pertains to a device or form of spring suspension, sometimes known as a shock absorber, intended to give easy-riding qualities to a vehicle.

A further object is to check the extreme movements of the springs serving the objects of making the vehicle ride easier and of lessening the liability of the springs to break.

Other and further objects and purposes will be hereinafter disclosed and particularly described and illustrated in the accompanying drawings in which—

Figure 1:
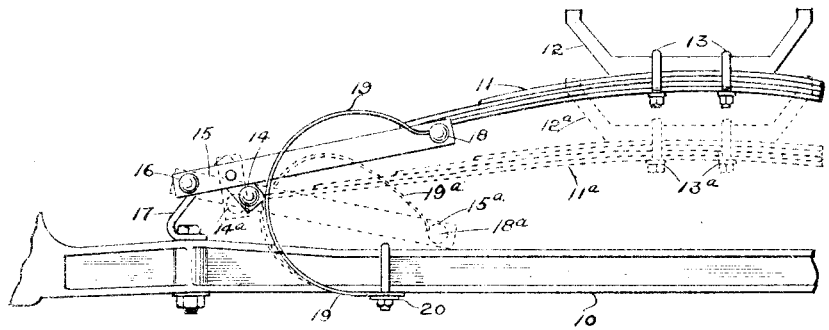
Figure 2:
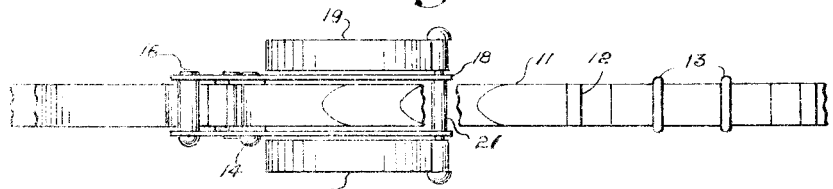
Figure 3:
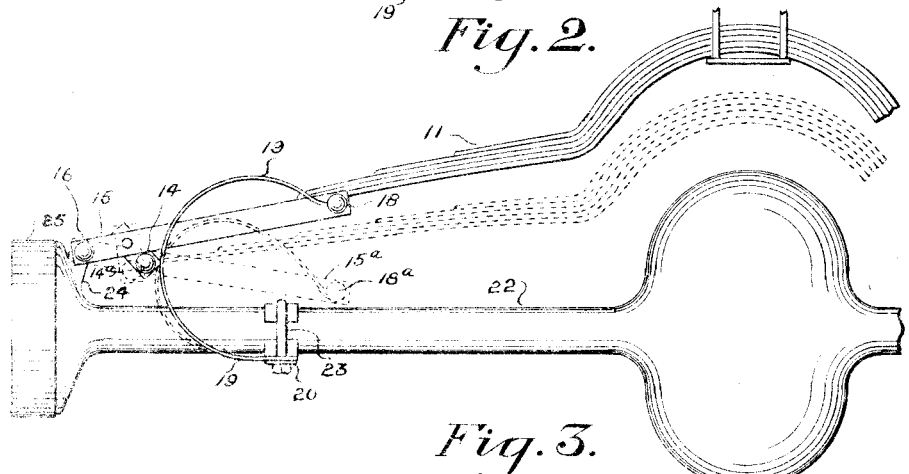
Figure 4:
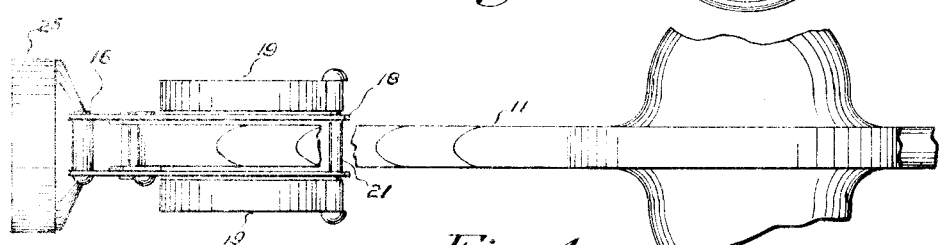

Figure 1, is a partial front view of a vehicle showing the spring suspension in elevation and part of the front axle and vehicle frame, Fig. 2, is a broken-away plan view of Fig. 1, Fig. 3, is a partial rear view of an automobile showing the spring suspension in elevation and part of the rear axle and automobile frame, and Fig. 4, is a broken-away plan view of Fig. 3.

In a detail description in which like numerals refer to like parts throughout the several views 10 indicates the front axle of a vehicle, 11 a leaf or laminated plate spring and 12 the body portion of the vehicle.

In the particular application shown in these figures the spring 11 is a cross-spring extending longitudinally of the vehicle axle and has its center portion rigidly fastened to the frame 12 by the clips 13. The two outer ends of this spring are each fastened to one of my devices, one of which, that is, one for one side of the vehicle, is shown in the figures.

The outer end of the spring 11 is formed into an eye which is pivoted to the lower end of swinging shackles or links 14. The upper ends of these shackles or links are pivoted to the levers 15. The levers 15 (in pairs) are pivoted at 16 to a support 17 which is rigidly attached to the axle 10. The pairs of levers 15 extend inwardly toward the center of the vehicle and a pin 18 connects the two underneath the spring 11.

A pair of springs 19 have their lower ends rigidly secured to the axle 10 as at 20, one extending upwardly on each side of the axle 10 and having their upper ends pivoted to the pin 18, one on each side of the spring 11. A roller 21 engages the pin 18 between the levers 15.

In Figs. 3 and 4 where the device is shown attached to the rear end of an automobile, the lower ends of the springs 19 are made secure to the casing 22 carrying the rear axle, by means of a yoke 23 engaging the casing 22 as shown while the levers 15 are pivoted to supports 24 reaching from the brake-drum 25.

The action of the device is as follows: In Figs. 1 and 3 the regular lines indicate the position of the different parts when the vehicle is not loaded and the dotted lines 11ª, 12ª, 13ª, 14ª, 15ª, 18ª and 19ª indicate approximately the extreme downward position of the parts occasioned by a load and the jar of the vehicle in passing over obstructions, inasmuch as the pin 18 connecting the levers 15 comes in contact with the axle 10. Intermediate positions (not shown) of the parts will take place, occasioned by the amount of the load in the vehicle, the rate of speed traveled and the character of the obstructions encountered. The springs 19 are proportioned with the levers 15 to be more resilient than the leaf spring 11. When the road wheels of the vehicle strike an obstruction, the springs 19 yield allowing the levers 15 to tilt downwardly throwing the pin 18 downwardly out of contact with the spring 11 and in the return action of the springs 19 the pin 18 is brought into contact with the spring 11, thereby gradually checking the return action of the springs 19. The springs provide for the light shocks to the vehicle and they together with the leaf spring provide for the severe shocks. A roller 21 is mounted on the pin 18 to prevent wear on the pin 18 and the spring 11.

What is claimed is,

1. In a vehicle, a support, a leaf-spring, a pair of levers pivoted to the support and extending inwardly toward the center of the leaf-spring and connected together thereunder, means for connecting the levers to the end of the leaf-spring, a pair of springs having their lower ends rigidly secured to the axle of the vehicle and their upper ends pivoted to said levers.

2. In a vehicle, a support, a leaf-spring, a pair of levers pivoted to the support and extending inwardly toward the center of the leaf-spring and connected together thereunder, links pivoted to said levers, means for connecting the leaf-spring to said links, a pair of springs having their lower ends rigidly secured to the axle of the vehicle and their upper ends pivoted to said levers.

In testimony whereof I affix my signature in presence of two witnesses.

CLARK ROBINSON.

Witnesses:
H. M. WILEY,
L. L. WESTFALL.